(12) United States Patent
Kamada

(10) Patent No.: US 11,148,755 B2
(45) Date of Patent: Oct. 19, 2021

(54) BICYCLE DERAILLEUR

(71) Applicant: SHIMANO INC., Sakai (JP)

(72) Inventor: Kenji Kamada, Sakai (JP)

(73) Assignee: SHIMANO INC., Sakai (JP)

(*) Notice: Subject to any disclaimer, the term of this patent is extended or adjusted under 35 U.S.C. 154(b) by 292 days.

(21) Appl. No.: 16/034,374

(22) Filed: Jul. 13, 2018

(65) Prior Publication Data
US 2020/0017169 A1 Jan. 16, 2020

(51) Int. Cl.
B62M 9/126 (2010.01)
B62M 9/16 (2006.01)

(52) U.S. Cl.
CPC .............. B62M 9/126 (2013.01); B62M 9/16 (2013.01)

(58) Field of Classification Search
CPC ...... B62M 9/126; B62M 9/16; B62M 9/1242; B62M 9/127; B62K 23/04
USPC ...................................... 474/80, 82
See application file for complete search history.

(56) References Cited

U.S. PATENT DOCUMENTS

| | | | | | |
|---|---|---|---|---|---|
| 2,099,477 A | * | 11/1937 | Gruyer | ................... | B62M 9/124 474/80 |
| 2,507,416 A | * | 5/1950 | Needham | .................. | B62M 9/16 474/80 |
| 3,125,894 A | * | 3/1964 | Juy | ........................ | B62M 9/124 74/473.1 |
| 4,058,020 A | * | 11/1977 | Huret | ..................... | B62M 9/126 474/80 |
| 4,174,642 A | * | 11/1979 | Martin | .................... | F16H 55/30 474/152 |
| 4,348,198 A | * | 9/1982 | Shimano | .............. | B62M 9/1248 474/135 |
| 4,392,841 A | * | 7/1983 | Juy | .......................... | B62M 9/10 474/156 |
| 4,410,313 A | * | 10/1983 | Shimano | ................ | B62M 9/128 474/134 |
| 4,433,963 A | * | 2/1984 | Shimano | .................. | B62M 9/16 474/134 |
| 4,530,677 A | * | 7/1985 | Nagano | ................... | B62M 9/126 474/80 |
| 4,575,365 A | * | 3/1986 | Nagano | .................... | B62M 9/16 474/80 |
| 4,580,327 A | * | 4/1986 | Juy | ..................... | B29C 45/0017 29/418 |

(Continued)

FOREIGN PATENT DOCUMENTS

CN 103538688 1/2014
JP 09-086472 3/1997

Primary Examiner — Henry Y Liu
(74) Attorney, Agent, or Firm — Mori & Ward, LLP

(57) ABSTRACT

A bicycle derailleur comprises a base member, a movable member, and a chain guide. The chain guide comprises an inner guide plate, an outer guide plate, at least one pulley axle, and at least one pulley. The chain guide is configured to be movable between a plurality of shifting positions. The at least one pulley is configured to be movable between the inner guide plate and the outer guide plate within a maximum pulley movable amount in a pulley axial direction with respect to a rotational center axis of the at least one pulley. A single shifting distance is defined between adjacent shifting positions of the plurality of shifting positions. A ratio of the maximum pulley movable amount to the single shifting distance ranges from 0.21 to 0.35.

24 Claims, 13 Drawing Sheets

(56) References Cited

U.S. PATENT DOCUMENTS

| | | | | |
|---|---|---|---|---|
| 4,938,733 A * | 7/1990 | Patterson | | B62K 23/04 474/80 |
| 5,066,264 A * | 11/1991 | Romano | | B62M 9/10 474/152 |
| 5,197,927 A * | 3/1993 | Patterson | | B62K 23/04 474/80 |
| 5,350,339 A * | 9/1994 | Carmichael | | B62M 9/16 474/120 |
| 5,466,194 A * | 11/1995 | Steinberg | | B62M 9/126 474/80 |
| 5,620,383 A * | 4/1997 | Patterson | | B62M 9/12 474/80 |
| 5,711,731 A * | 1/1998 | Fukuda | | B62M 9/16 474/160 |
| 6,066,057 A * | 5/2000 | Nakamura | | B62M 9/122 280/216 |
| 6,234,926 B1 * | 5/2001 | Soon | | B25B 27/0071 188/24.11 |
| 7,244,203 B2 * | 7/2007 | Sze | | B62M 9/126 474/144 |
| 7,318,784 B2 * | 1/2008 | Onogi | | B62M 9/1242 474/80 |
| 7,361,110 B2 * | 4/2008 | Oishi | | B62M 9/1242 474/82 |
| 7,666,111 B2 * | 2/2010 | Shahana | | B62M 9/125 474/83 |
| 7,674,198 B2 * | 3/2010 | Yamaguchi | | B62M 9/16 474/82 |
| 7,722,488 B2 * | 5/2010 | Kunisawa | | B62M 9/126 474/82 |
| 7,824,285 B2 * | 11/2010 | Tan | | B62M 9/1244 474/80 |
| 8,105,193 B2 * | 1/2012 | Oseto | | B62M 9/126 474/82 |
| 8,419,573 B2 * | 4/2013 | Yamaguchi | | B62M 9/127 474/82 |
| 8,721,495 B2 * | 5/2014 | Kitamura | | B62M 9/122 477/7 |
| 9,005,059 B2 * | 4/2015 | Suyama | | B62M 9/122 474/82 |
| 9,033,833 B2 * | 5/2015 | Johnson | | B62M 25/04 474/80 |
| 9,316,302 B2 * | 4/2016 | Braedt | | F16H 55/30 |
| 9,581,229 B2 * | 2/2017 | Pfeiffer | | F16H 55/30 |
| 10,696,357 B2 * | 6/2020 | Lazzarin | | B62M 9/121 |
| 2014/0162821 A1 * | 6/2014 | Braedt | | F16H 55/30 474/155 |
| 2016/0152301 A1 * | 6/2016 | Bortoli | | B62M 9/124 474/82 |

* cited by examiner

BICYCLE DERAILLEUR

BACKGROUND OF THE INVENTION

Field of the Invention

The present invention relates to a bicycle derailleur.

Discussion of the Background

Japanese Patent Application Publication H09-086472 describes a pulley of a rear derailleur. For example, FIGS. 1 to 6 of H09-086472 illustrate a bearing supporting the pulley.

SUMMARY OF THE INVENTION

In accordance with a first aspect of the present invention, a bicycle derailleur comprises a base member, a movable member, and a chain guide. The base member is configured to be attached to a bicycle frame. The movable member is configured to be movable relative to the base member. The chain guide is mounted to the movable member. The chain guide comprises an inner guide plate, an outer guide plate, at least one pulley axle, and at least one pulley. The at least one pulley axle is configured to be coupled to the inner guide plate and the outer guide plate. The at least one pulley is configured to be rotatably supported around the at least one pulley axle. The chain guide is configured to be movable between a plurality of shifting positions. The at least one pulley is configured to be movable between the inner guide plate and the outer guide plate within a maximum pulley movable amount in a pulley axial direction with respect to a rotational center axis of the at least one pulley. A single shifting distance is defined between adjacent shifting positions of the plurality of shifting positions. A ratio of the maximum pulley movable amount to the single shifting distance ranges from 0.21 to 0.35.

With the bicycle derailleur according to the first aspect, a position of the at least one pulley can be automatically and effectively adjusted in the pulley axial direction when an actual position of the chain guide is offset from the shifting position in the pulley axial direction. Thus, it is possible to absorb error of the position of the chain guide, improving a shifting operation of a bicycle chain. Furthermore, the position of the at least one pulley can be automatically and effectively adjusted in the pulley axial direction when the chain guide is moved from a current shifting position to an adjacent shifting position to shift the bicycle chain from a current sprocket to an adjacent sprocket. This can smooth the movement of the bicycle chain from the current sprocket to the adjacent sprocket during the shifting operation.

In accordance with a second aspect of the present invention, the bicycle derailleur according to the first aspect is configured so that the ratio of the maximum pulley movable amount to the single shifting distance ranges from 0.24 to 0.30.

With the bicycle derailleur according to the second aspect, a position of the at least one pulley is automatically and more effectively adjusted in the pulley axial direction when the actual position of the chain guide is offset from the shifting position in the pulley axial direction. Thus, it is possible to further absorb error of the position of the chain guide, improving a shifting operation of the bicycle chain. Furthermore, the position of the at least one pulley can be automatically and more effectively adjusted in the pulley axial direction when the chain guide is moved from a current shifting position to an adjacent shifting position to shift the bicycle chain from a current sprocket to an adjacent sprocket. This can smooth the movement of the bicycle chain from the current sprocket to the adjacent sprocket during the shifting operation.

In accordance with a third aspect of the present invention, the bicycle derailleur according to the first or second aspect is configured so that the plurality of shifting positions includes at least nine shifting positions.

With the bicycle derailleur according to the third aspect, it is possible to improve the shifting operation of the bicycle chain in a multistage sprocket corresponding to the at least nine shifting positions.

In accordance with a fourth aspect of the present invention, the bicycle derailleur according to the first or second aspect is configured so that the plurality of shifting positions includes at least eleven shifting positions.

With the bicycle derailleur according to the fourth aspect, it is possible to improve the shifting operation of the bicycle chain in a multistage sprocket corresponding to the at least eleven shifting positions.

In accordance with a fifth aspect of the present invention, the bicycle derailleur according to any one of the first to fourth aspects is configured so that the at least one pulley axle includes a guide-pulley axle and a tension-pulley axle. The at least one pulley includes a guide pulley and a tension pulley. The guide pulley is configured to be rotatably supported around the guide-pulley axle. The tension pulley is configured to be rotatably supported around the tension-pulley axle. The guide pulley is configured to be movable between the inner guide plate and the outer guide plate within the maximum pulley movable amount in the pulley axial direction.

With the bicycle derailleur according to the fifth aspect, the maximum pulley movable amount can enlarge an area where a position of the guide pulley is automatically adjusted within in the pulley axial direction when an actual position of the chain guide is offset from the shifting position in the pulley axial direction. Thus, it is possible to absorb error of the position of the chain guide, improving a shifting operation of the bicycle chain.

In accordance with a sixth aspect of the present invention, the bicycle derailleur according to the fifth aspect is configured so that the at least one pulley axle further includes an additional pulley axle. The at least one pulley further includes an additional pulley configured to be rotatably supported around the additional pulley axle.

With the bicycle derailleur according to the sixth aspect, it is possible to improve the shifting operation of the bicycle chain in the bicycle derailleur including at least three pulley.

In accordance with a seventh aspect of the present invention, the bicycle derailleur according to any one of the first to fifth aspects is configured so that the at least one pulley includes a pulley body and a plurality of pulley teeth extending radially outwardly from the pulley body with respect to the rotational center axis. The plurality of pulley teeth includes at least one first pulley tooth and at least one second pulley tooth. The at least one first pulley tooth has a first chain-engaging axial width. The at least one second pulley tooth has a second chain-engaging axial width that is smaller than the first chain-engaging axial width.

With the bicycle derailleur according to the seventh aspect, it is possible to improve the shifting operation the bicycle chain having the first chain-engaging axial width and the second chain engaging-axial width.

In accordance with an eighth aspect of the present invention, the bicycle derailleur according to the seventh aspect is configured so that the at least one first pulley tooth is configured to engage with a pair of opposed outer link plates of a bicycle chain. The at least one second pulley tooth is configured to engage with a pair of opposed inner link plates of the bicycle chain.

With the bicycle derailleur according to the eighth aspect, it is possible to effectively improve the shifting operation the bicycle chain having the first chain-engaging axial width and the second chain engaging-axial width.

In accordance with a ninth aspect of the present invention, a bicycle derailleur comprises a base member, a movable member, and a chain guide. The base member is configured to be attached to a bicycle frame. The movable member is configured to be movable relative to the base member. The chain guide is mounted to the movable member. The chain guide comprises an inner guide plate, an outer guide plate, at least one pulley axle, and at least one pulley. The at least one pulley axle is configured to be coupled to the inner guide plate and the outer guide plate. The at least one pulley is configured to be rotatably supported around the at least one pulley axle. The chain guide is configured to be movable between a plurality of shifting positions. The at least one pulley is configured to be movable between the inner guide plate and the outer guide plate within a maximum pulley movable amount in a pulley axial direction with respect to a rotational center axis of the at least one pulley. A single shifting distance is defined between adjacent shifting positions of the plurality of shifting positions. The single shifting distance is smaller than 4.8 mm. The maximum pulley movable amount is larger than 0.8 mm.

With the bicycle derailleur according to the ninth aspect, a position of the at least one pulley can be automatically and effectively adjusted in the pulley axial direction when an actual position of the chain guide is offset from the shifting position in the pulley axial direction. Thus, it is possible to absorb error of the position of the chain guide, improving a shifting operation of the bicycle chain. Furthermore, the position of the at least one pulley can be automatically and effectively adjusted in the pulley axial direction when the chain guide is moved from a current shifting position to an adjacent shifting position to shift the bicycle chain from a current sprocket to an adjacent sprocket. This can smooth the movement of the bicycle chain from the current sprocket to the adjacent sprocket during the shifting operation.

In accordance with a tenth aspect of the present invention, the bicycle derailleur according to the ninth aspect is configured so that the single shifting distance is smaller than 4.5 mm.

With the bicycle derailleur according to the tenth aspect, it is possible to improve the shifting operation of the bicycle chain in a compact multistage sprocket.

In accordance with an eleventh aspect of the present invention, the bicycle derailleur according to the ninth aspect is configured so that the single shifting distance is smaller than 4.2 mm.

With the bicycle derailleur according to the eleventh aspect, it is possible to improve the shifting operation of the bicycle chain in a more compact multistage sprocket.

In accordance with a twelfth aspect of the present invention, the bicycle derailleur according to the ninth aspect is configured so that the single shifting distance is larger than 3.5 mm.

With the bicycle derailleur according to the twelfth aspect, it is possible to improve the shifting operation of the bicycle chain in a more compact multistage sprocket.

In accordance with a thirteenth aspect of the present invention, the bicycle derailleur according to any one of the ninth to twelfth aspects is configured so that the maximum pulley movable amount is larger than 0.9 mm.

With the bicycle derailleur according to the thirteenth aspect, it is possible to further improve the shifting operation of the bicycle chain.

In accordance with a fourteenth aspect of the present invention, the bicycle derailleur according to any one of the ninth to thirteenth aspects is configured so that the maximum pulley movable amount is smaller than 1.5 mm.

With the bicycle derailleur according to the fourteenth aspect, it is possible to further improve the shifting operation of the bicycle chain.

In accordance with a fifteenth aspect of the present invention, the bicycle derailleur according to any one of the ninth to fourteenth aspects is configured so that the plurality of shifting positions includes at least nine shifting positions.

With the bicycle derailleur according to the fifteenth aspect, it is possible to improve the shifting operation of the bicycle chain in a multistage sprocket corresponding to the at least nine shifting positions.

In accordance with a sixteenth aspect of the present invention, the bicycle derailleur according to any one of the ninth to fourteenth aspects is configured so that the plurality of shifting positions includes at least eleven shifting positions.

With the bicycle derailleur according to the sixteenth aspect, it is possible to improve the shifting operation of the bicycle chain in a multistage sprocket corresponding to the at least eleven shifting positions.

In accordance with a seventeenth aspect of the present invention, the bicycle derailleur according to any one of the ninth to sixteenth aspects is configured so that the at least one pulley axle includes a guide-pulley axle and a tension-pulley axle. The at least one pulley includes a guide pulley and a tension pulley. The guide pulley is configured to be rotatably supported around the guide-pulley axle. The tension pulley is configured to be rotatably supported around the tension-pulley axle. The guide pulley is configured to be movable between the inner guide plate and the outer guide plate within the maximum pulley movable amount in the pulley axial direction.

With the bicycle derailleur according to the seventeenth aspect, a position of the guide pulley is automatically and effectively adjusted in the pulley axial direction when an actual position of the chain guide is offset from the shifting position in the pulley axial direction. Thus, it is possible to absorb error of the position of the chain guide, improving a shifting operation of the bicycle chain. Furthermore, the position of the at least one pulley can be automatically and more effectively adjusted in the pulley axial direction when the chain guide is moved from a current shifting position to an adjacent shifting position to shift the bicycle chain from a current sprocket to an adjacent sprocket. This can smooth the movement of the bicycle chain from the current sprocket to the adjacent sprocket during the shifting operation.

In accordance with an eighteenth aspect of the present invention, the bicycle derailleur according to the seventeenth aspect is configured so that the at least one pulley axle further includes an additional pulley axle. The at least one pulley further includes an additional pulley configured to be rotatably supported around an additional pulley axle.

With the bicycle derailleur according to the eighteenth aspect, it is possible to improve the shifting operation of the bicycle chain in the bicycle derailleur including at least three pulley.

In accordance with a nineteenth aspect of the present invention, the bicycle derailleur according to any one of the ninth to eighteenth aspects is configured so that the at least one pulley includes a pulley body and a plurality of pulley teeth extending radially outwardly from the pulley body with respect to the rotational center axis. The plurality of pulley teeth includes at least one first pulley tooth and at least one second pulley tooth. The at least one first pulley tooth has a first chain-engaging axial width. The at least one second pulley tooth has a second chain-engaging axial width that is smaller than the first chain-engaging axial width.

With the bicycle derailleur according to the nineteenth aspect, it is possible to improve the shifting operation the bicycle chain having the first chain-engaging axial width and the second chain engaging-axial width.

In accordance with a twentieth aspect of the present invention, the bicycle derailleur according to the nineteenth aspect is configured so that the at least one first pulley tooth is configured to engage with a pair of opposed outer link plate of a bicycle chain. The at least one second pulley tooth is configured to engage with a pair of opposed inner link plate of the bicycle chain.

With the bicycle derailleur according to the twentieth aspect, it is possible to effectively improve the shifting operation the bicycle chain having the first chain-engaging axial width and the second chain engaging-axial width.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
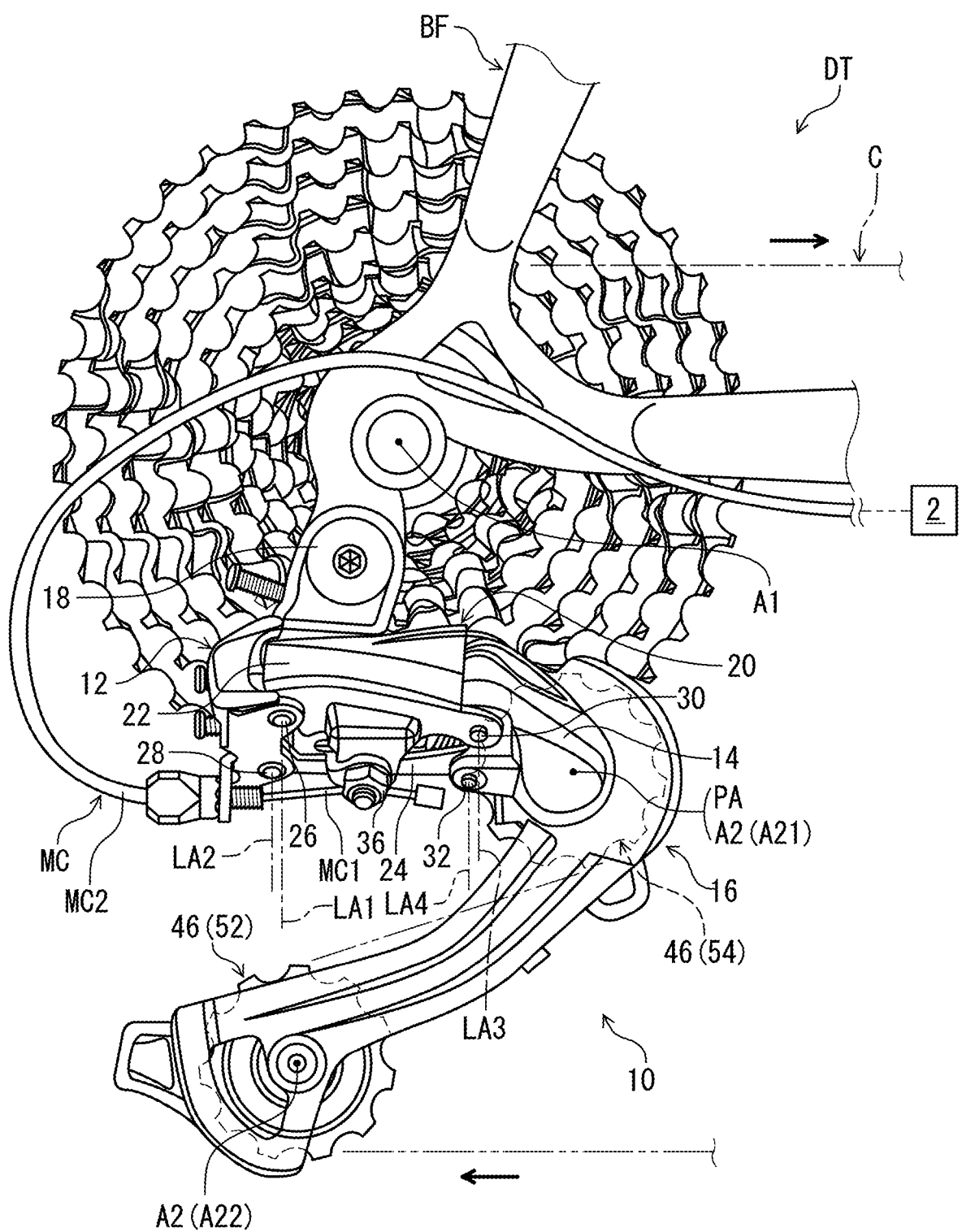
FIG. 1 is a side elevational view of a drive train including a bicycle derailleur in accordance with an embodiment.

The embodiment(s) will now be described with reference to the accompanying drawings, wherein like reference numerals designate corresponding or identical elements throughout the various drawings.

As seen in FIG. 1, a drive train DT comprises a bicycle derailleur 10 in accordance with an embodiment, a bicycle sprocket assembly SP, and a bicycle chain C. The bicycle derailleur 10 comprises a base member 12, a movable member 14, and a chain guide 16. The base member 12 is configured to be attached to a bicycle frame BF. The base member 12 is secured to the bicycle frame BF with a fastener 18 such as a bolt. The movable member 14 is configured to be movable relative to the base member 12. The chain guide 16 is mounted to the movable member 14. The chain guide 16 is configured to shift the bicycle chain C relative to the bicycle sprocket assembly SP. The bicycle sprocket assembly SP is rotatable relative to the bicycle frame BF about a rotational axis A1.

In this embodiment, the bicycle derailleur 10 is configured to be connected to an operating device 2 with a mechanical cable MC. The bicycle derailleur 10 is mounted to the bicycle frame BF to shift the bicycle chain C relative to the bicycle sprocket assembly SP in response to a movement of an inner wire MC1 of the mechanical cable MC.

The bicycle derailleur 10 includes a linkage structure 20 configured to movably couple the movable member 14 to the base member 12. The linkage structure 20 includes a first link 22, a second link 24, a first link pin 26, a second link pin 28, a third link pin 30, and a fourth link pin 32. The first link pin 26 defines a first link axis LA1. The second link pin 28 defines a second link axis LA2. The third link pin 30 defines a third link axis LA3. The fourth link pin 32 defines a fourth link axis LA4. The first link axis LA1, the second link axis LA2, the third link axis LA3, and the fourth link axis LA4 are parallel to or substantially parallel to each other.

The chain guide 16 is pivotally coupled to the movable member 14 about a pivot axis PA. The first link pin 26 pivotally couples the first link 22 to the base member 12 about the first link axis LA1. The second link pin 28 pivotally couples the second link 24 to the base member 12 about the second link axis LA2. The third link pin 30 pivotally couples the first link 22 to the movable member 14 about the third link axis LA3. The fourth link pin 32 pivotally couples the second link 24 to the movable member 14 about the fourth link axis LA4. The first link 22, the second link 24, the first link pin 26, the second link pin 28, the third link pin 30, and the fourth link pin 32 constitute a four-bar linkage. However, the structures of the movable member 14 and the linkage structure 20 are not limited to this embodiment.

At least one of the first link 22 and the second link 24 includes a wire fastener 38. In this embodiment, the first link 22 includes the wire fastener 38. However, the second link 24 or both the first link 22 and the second link 24 can include the wire fastener 38. The wire fastener 38 is configured to couple the inner wire MC1 of the mechanical cable MC. The first link 22 and the second link 24 pivot relative to the base member 12 in response to the movement of the inner wire MC1.

Figure 2:
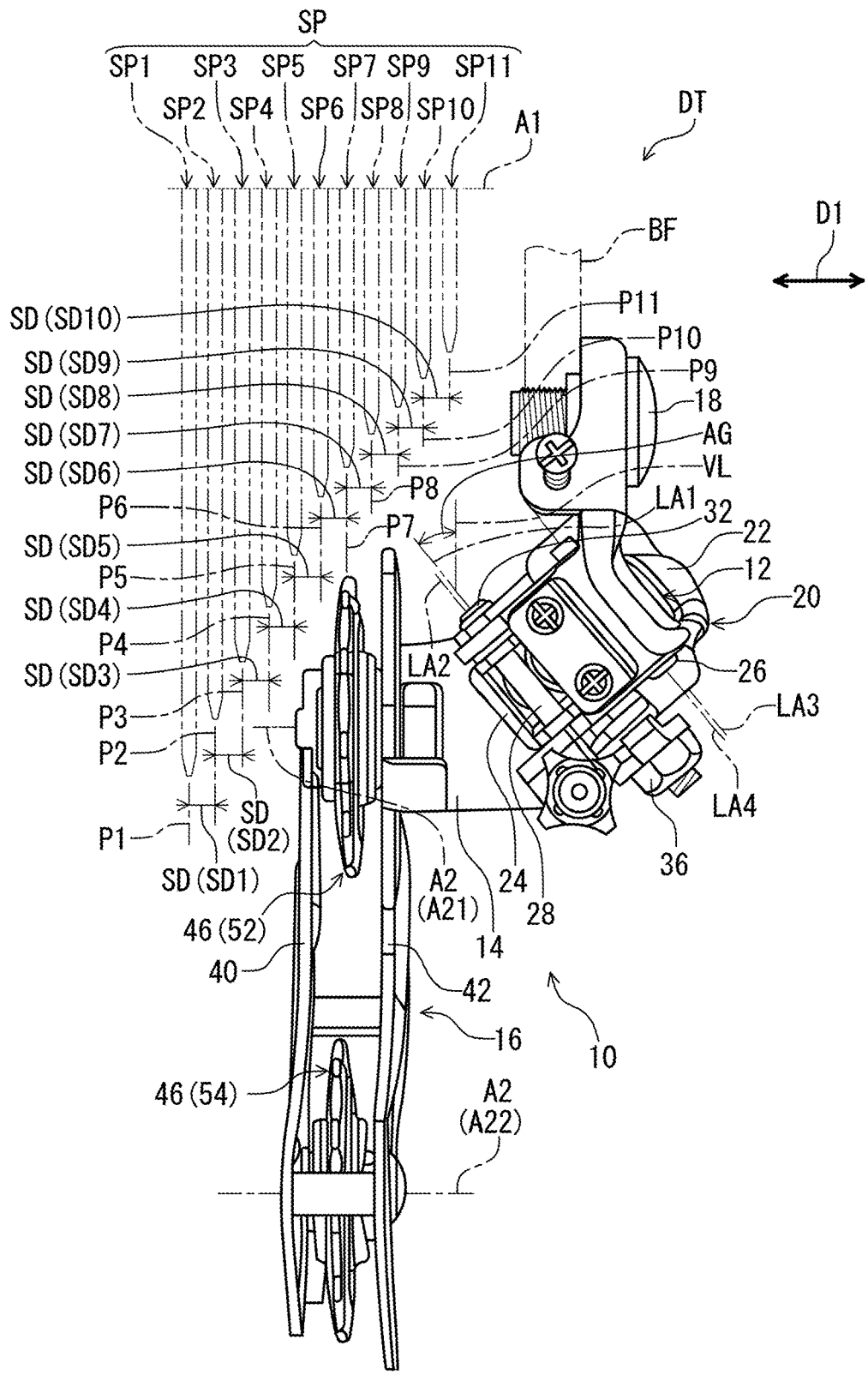
FIG. 2 is a rear view of the bicycle derailleur of the drive train illustrated in FIG. 1.

As seen in FIG. 2, an inclination angle AG of the first link axis LA1 relative to a vertical line VL is equal to or smaller than 20 degrees in a state where the bicycle derailleur 10 is mounted to the bicycle frame BF. The vertical line VL is an imaginary line parallel to a center plane of the bicycle frame BF. The inclination angle AG is preferably equal to or smaller than 15 degrees. However, the inclination angle AG is not limited to this embodiment and the above ranges.

The chain guide 16 is configured to be movable between a plurality of shifting positions. A single shifting distance SD is defined between adjacent shifting positions of the plurality of shifting positions. The single shifting distance SD is defined between adjacent shifting positions of the plurality of shifting positions in a pulley axial direction D1.

The plurality of shifting positions includes at least nine shifting positions. The plurality of shifting positions includes at least eleven shifting positions. In this embodiment, the plurality of shifting positions includes eleven shifting positions P1 to P11. The operating device 2 is configured to position the inner wire MC1 relative to the outer casing MC2 in one of eleven operation positions respectively corresponding to the shifting position P1 to P11. However, a total number of the shifting positions is not limited to this embodiment.

A single shifting distance SD1 is defined between adjacent shifting positions P1 and P2 of the plurality of shifting positions P1 to P11. A single shifting distance SD2 is defined between adjacent shifting positions P2 and P3 of the plurality of shifting positions P1 to P11. A single shifting distance SD3 is defined between adjacent shifting positions P3 and P4 of the plurality of shifting positions P1 to P11. A single shifting distance SD4 is defined between adjacent shifting positions P4 and P5 of the plurality of shifting positions P1 to P11. A single shifting distance SD5 is defined between adjacent shifting positions P5 and P6 of the plurality of shifting positions P1 to P11. A single shifting distance SD6 is defined between adjacent shifting positions P6 and P7 of the plurality of shifting positions P1 to P11. A single shifting distance SD7 is defined between adjacent shifting positions P7 and P8 of the plurality of shifting positions P1 to P11. A single shifting distance SD8 is defined between adjacent shifting positions P8 and P9 of the plurality of shifting positions P1 to P11. A single shifting distance SD9 is defined between adjacent shifting positions P9 and P10 of the plurality of shifting positions P1 to P11. A single shifting distance SD10 is defined between adjacent shifting positions P10 and P11 of the plurality of shifting positions P1 to P11.

In this embodiment, the single shifting distances SD1 to SD10 are equal to each other. However, at least one of the single shifting distances SD1 to SD10 can be different from another of the single shifting distances SD1 to SD10.

In this embodiment, the single shifting distance SD is smaller than 4.8 mm. The single shifting distance SD is smaller than 4.5 mm. The single shifting distance SD is smaller than 4.2 mm. The single shifting distance SD is larger than 3.5 mm. In this embodiment, the single shifting distance SD is 4.1 mm. However, the single shifting distance SD is not limited to this embodiment and the above ranges.

The bicycle sprocket assembly SP includes first to eleventh sprockets SP1 to SP11. The shifting positions P1 to P11 respectively correspond to the first to eleventh sprockets SP1 to SP11. The chain guide 16 is moved in accordance with the shifting positions P1 to P11. For example, the shifting positions P1 to P11 are defined as target axial positions of the chain guide 16 in the pulley axial direction D1. Thus, an actual axial position of the chain guide 16 can be offset from one of shifting positions P1 to P11 due to a manufacturing error and/or an assembly error of the bicycle derailleur 10. The shifting positions P1 to P11 can also defined as target positions of the movable member 14. the are not actual axial positions of the chain guide 16 in the pulley axial direction D1. For example, the bicycle chain C is engaged with the first sprocket SP1 in a state where the chain guide 16 is in the shifting position P1. The bicycle chain C is shifted from the first sprocket SP1 to the second sprocket SP2 when the chain guide 16 is moved from the shifting position P1 to the shifting position P2. The shifting positions P1 to P11 can also be referred to as first to eleventh shifting positions P1 to P11, respectively. A total number of the sprockets of the bicycle sprocket assembly SP is not limited to this embodiment.

Figure 3:
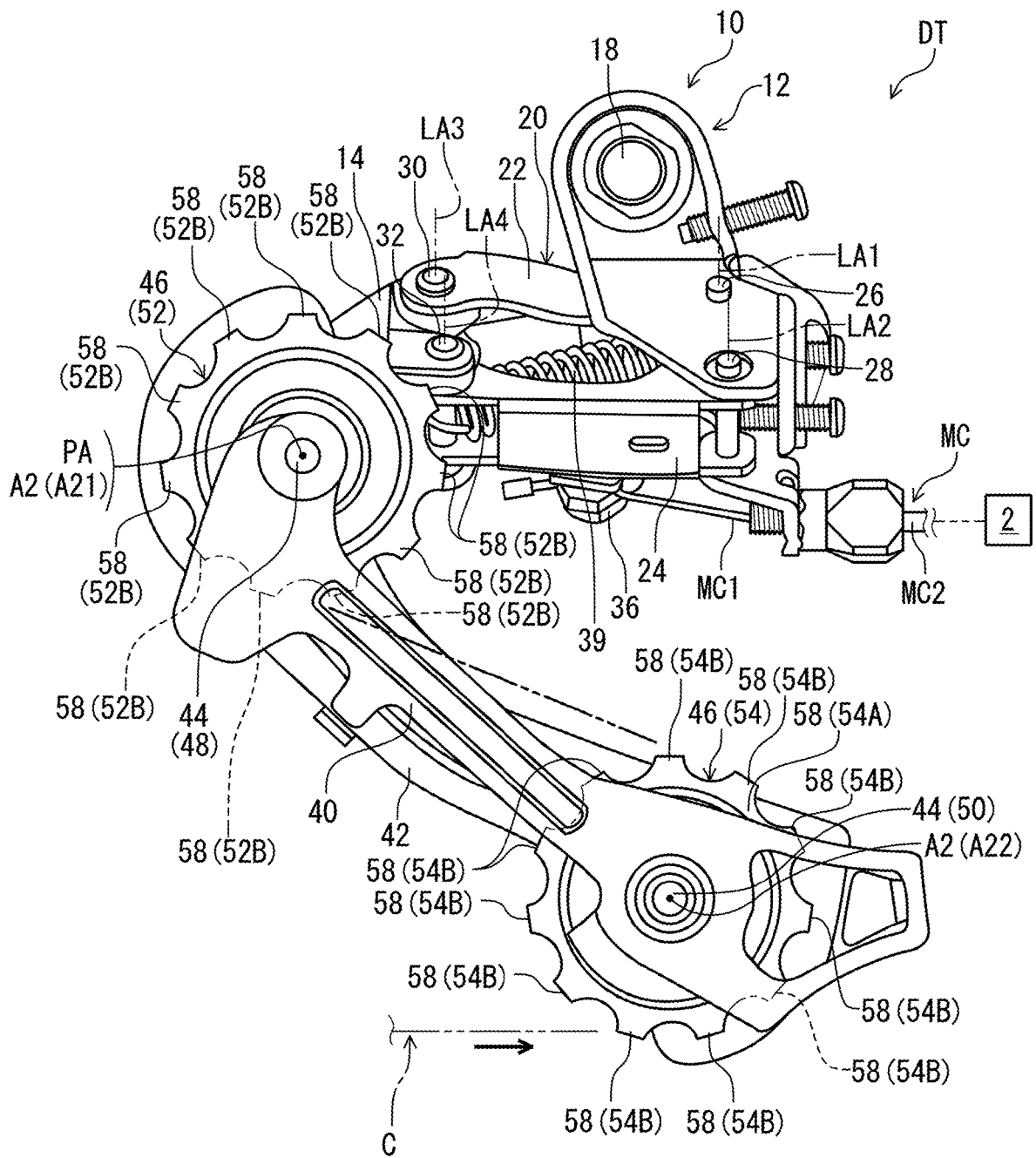
FIG. 3 is another side elevational view of the bicycle derailleur of the drive train illustrated in FIG. 1.

As seen in FIG. 3, the bicycle derailleur 10 comprises a biasing member 39. The biasing member 39 is mounted to the linkage structure 20. The chain guide 16 is held in one of the shifting positions P1 to P11 by the inner wire MC1 of the mechanical cable MC and a biasing force of the biasing member 39.

The chain guide 16 comprises an inner guide plate 40, an outer guide plate 42, at least one pulley axle 44, and at least one pulley 46. The at least one pulley axle 44 is configured to be coupled to the inner guide plate 40 and the outer guide plate 42. The at least one pulley 46 is configured to be rotatably supported around the at least one pulley axle 44. The at least one pulley 46 is rotatable relative to the inner guide plate 40 and the outer guide plate 42 about a rotational center axis A2.

In this embodiment, the at least one pulley axle 44 includes a guide-pulley axle 48 and a tension-pulley axle 50. The guide-pulley axle 48 is coupled to the inner guide plate 40 and the outer guide plate 42. The tension-pulley axle 50 is coupled to the inner guide plate 40 and the outer guide plate 42. The guide-pulley axle 48 defines a rotational center axis A21. The tension-pulley axle 50 defines a rotational center axis A22. The at least one pulley 46 includes a guide pulley 52 and a tension pulley 54. The guide pulley 52 is configured to be rotatably supported around the guide-pulley axle 48. The tension pulley 54 is configured to be rotatably supported around the tension-pulley axle 50. The guide pulley 52 is closer to the pivot axis PA of the movable member 14 than the tension pulley 54. The guide pulley 52 is rotatable relative to the inner guide plate 40 and the outer guide plate 42 about the rotational center axis A21. The tension pulley 54 is rotatable relative to the inner guide plate 40 and the outer guide plate 42 about the rotational center axis A22. In this embodiment, the rotational center axis A21 is coincident with the pivot axis PA. However, the rotational center axis A21 can be offset from the pivot axis PA. As seen in FIG. 1, the guide pulley 52 is closer to the rotational axis A1 of the bicycle sprocket assembly SP than the tension pulley 54 in a state where the bicycle derailleur 10 is mounted to the bicycle frame BF.

As seen in FIG. 3, the at least one pulley 46 includes a pulley body 56 and a plurality of pulley teeth 58 extending radially outwardly from the pulley body 56 with respect to the rotational center axis A2. In this embodiment, the guide pulley 52 includes a guide-pulley body 52A and a plurality of guide-pulley teeth 52B extending radially outwardly from the guide-pulley body 52A with respect to the rotational center axis A21. The tension pulley 54 includes a tension-pulley body 54A and a plurality of tension-pulley teeth 54B extending radially outwardly from the tension-pulley body 54A with respect to the rotational center axis A22. The pulley tooth 58 (the guide-pulley tooth 52B, the tension-pulley tooth 54B) is configured to engage with the bicycle chain C.

Figure 4:
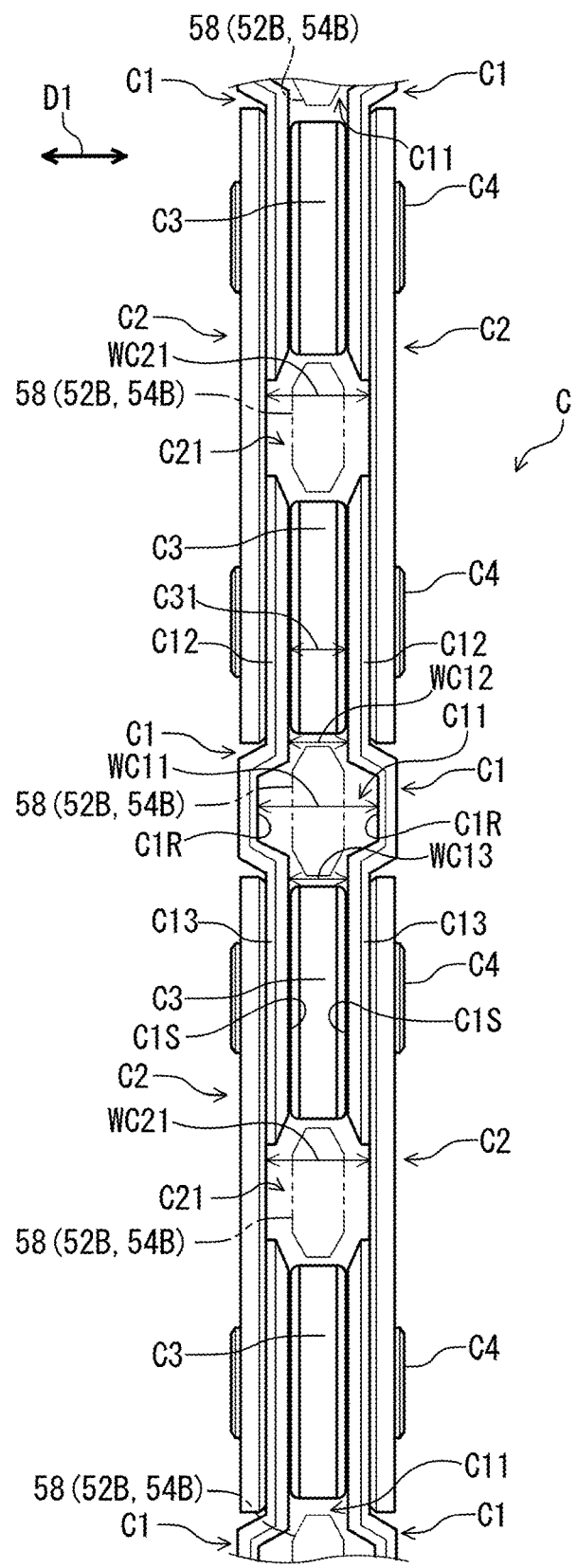
FIG. 4 is a top view of a bicycle chain of the drive train illustrated in FIG. 1.

As seen in FIG. 4, the bicycle chain C includes pairs of opposed inner link plates C1, pairs of opposed outer link plates C2, a plurality of rollers C3, and a plurality of pins C4. The roller C3 is provided between the opposed inner link plates C1. The pin C4 pivotally couples the opposed inner link plates C1 to the opposed outer link plates C2. An inner link space C11 is defined between the opposed inner link plates C1. An outer link space C21 is defined between the opposed outer link plates C2.

The inner link plate C1 includes a recess C1R provided on an inner surface C1S of the inner link plate C1. The inner link plate C1 includes a first end portion C12 and a second end portion C13. The first end portion C12 is contactable with the roller C3. The second end portion C13 is contactable with the roller C3. The inner link space C11 has an axial width WC11 which is larger than an axial distance WC12 between the opposed first end portions C12 of the inner link plates C1 and larger than an axial distance WC13 between the opposed second end portions C13 of the inner link plates C1.

Figure 5:
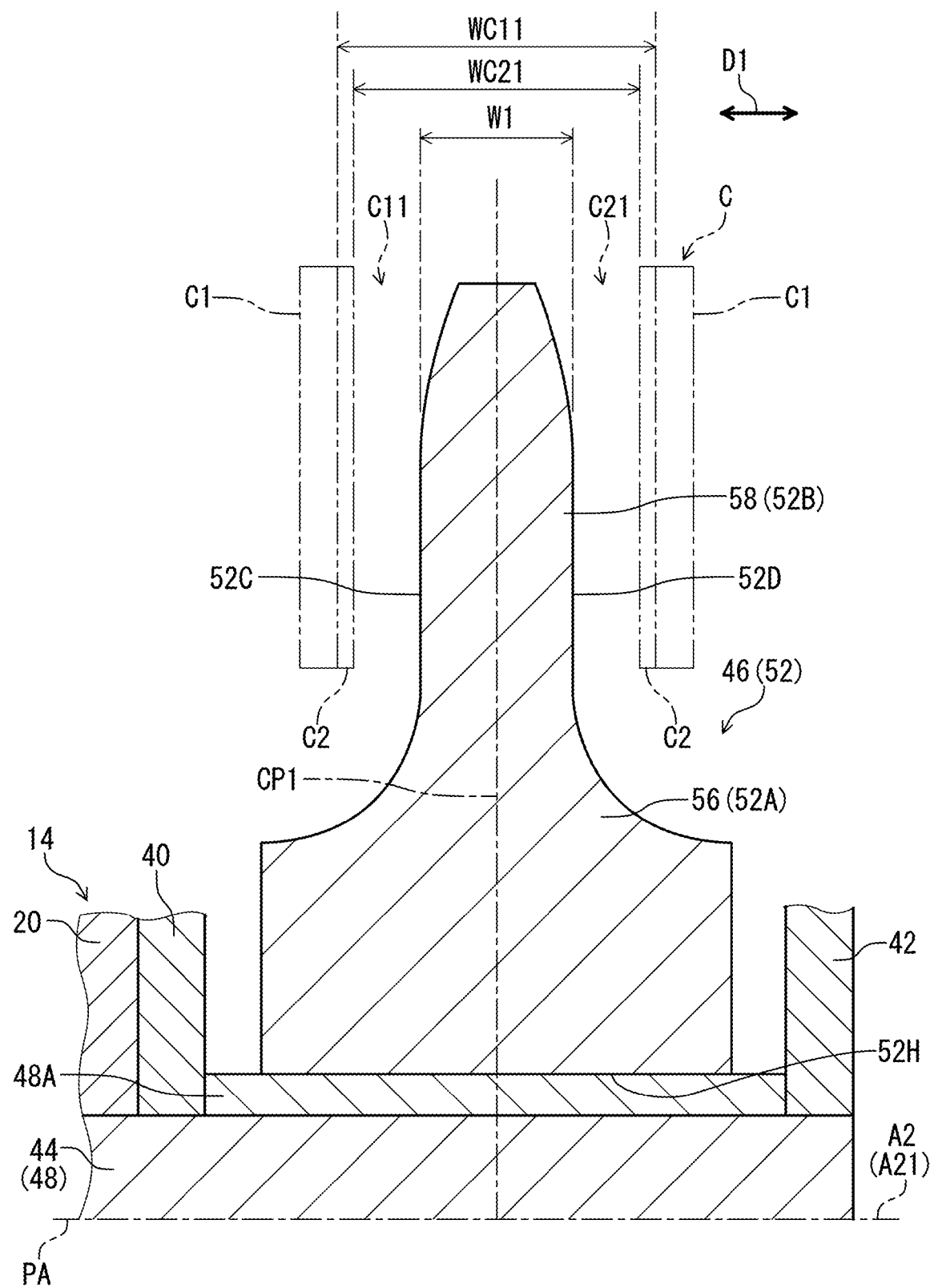
FIG. 5 is a cross-sectional view of a guide pulley of the bicycle derailleur illustrated in FIG. 3.

As seen in FIG. 5, the guide-pulley tooth 52B has a chain-engaging axial width W1 defined in the pulley axial direction D1 with respect to the rotational center axis A21. The guide-pulley tooth 52B includes a first axial surface 52C and a second axial surface 52D. The first axial surface 52C at least partially faces in the pulley axial direction D1 to be engageable with one of the inner link plate C1 and the outer link plate C2 of the bicycle chain C. The second axial surface 52D at least partially faces in the pulley axial direction D1 to be engageable with one of another inner link plate C1 and another outer link plate C2 of the bicycle chain C. The second axial surface 52D is provided on a reverse side of the first axial surface 52C in the pulley axial direction D1. The chain-engaging axial width W1 is defined from the first axial surface 52C to the second axial surface 52D in the pulley axial direction D1. The guide pulley 52 has an axial center plane CP1 defined to bisect the chain-engaging axial width W1. The axial center plane CP1 is perpendicular to the rotational center axis A21.

The chain-engaging axial width W1 is smaller than the axial width WC11 of the inner link space C11 defined between the opposed inner link plates C1. The chain-engaging axial width W1 is smaller than an axial width WC21 of the outer link space C21 defined between the opposed outer link plates C2.

Figure 6:
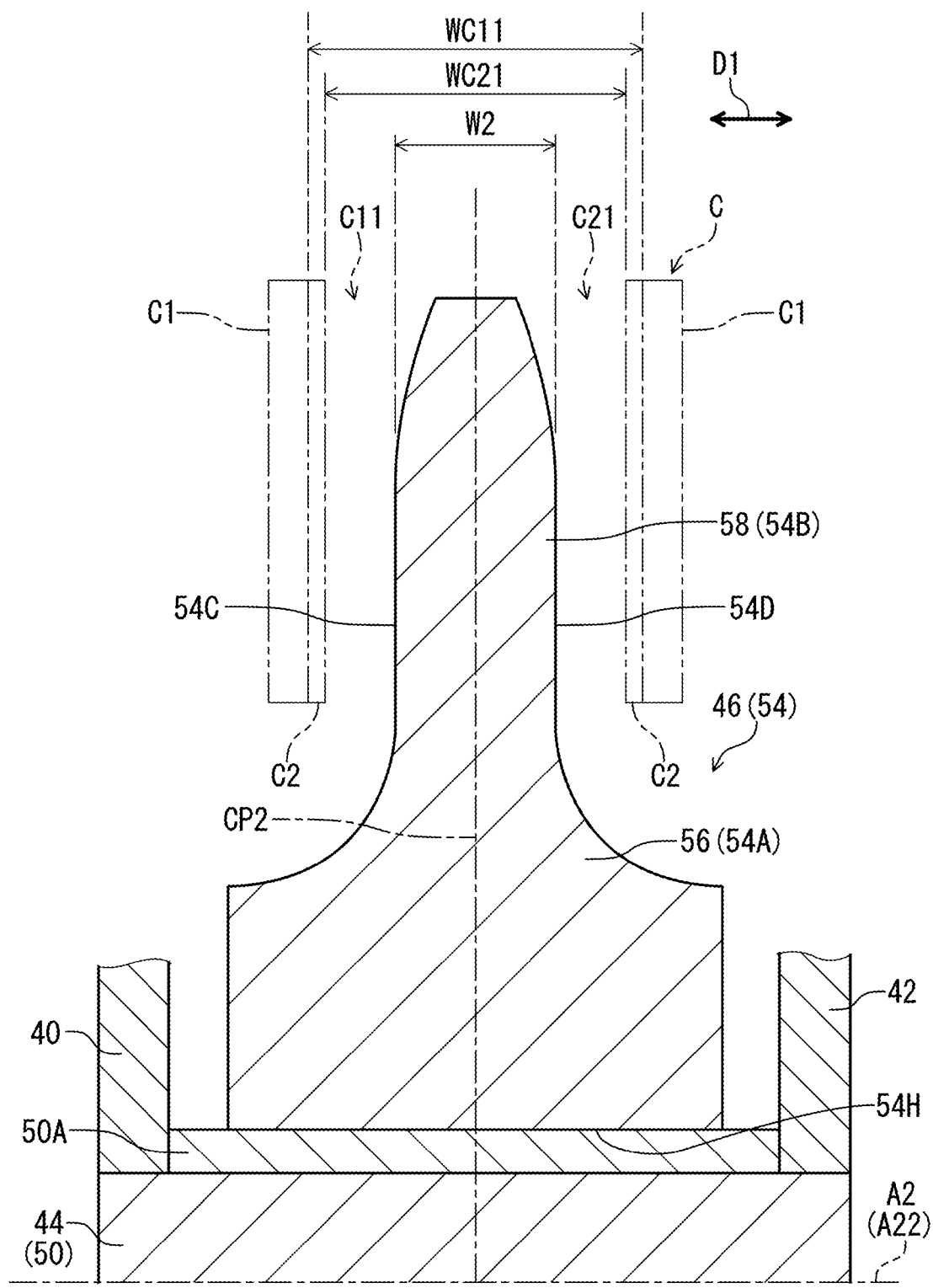
FIG. 6 is a cross-sectional view of a tension pulley of the bicycle derailleur illustrated in FIG. 3.

As seen in FIG. 6, the tension-pulley tooth 54B has a chain-engaging axial width W2 defined in the pulley axial direction D1 with respect to the rotational center axis A22. The tension-pulley tooth 54B includes a first axial surface 54C and a second axial surface 54D. The first axial surface 54C at least partially faces in the pulley axial direction D1 to be engageable with one of the inner link plate C1 and the outer link plate C2 of the bicycle chain C. The second axial surface 54D at least partially faces in the pulley axial direction D1 to be engageable with one of another inner link plate C1 and another outer link plate C2 of the bicycle chain C. The second axial surface 54D is provided on a reverse side of the first axial surface 54C in the pulley axial direction D1. The chain-engaging axial width W2 is defined from the first axial surface 54C to the second axial surface MD in the pulley axial direction D1. The tension pulley 54 has an axial center plane CP2 defined to bisect the chain-engaging axial width W2. The axial center plane CP2 is perpendicular to the rotational center axis A22.

The chain-engaging axial width W2 is smaller than the axial width WC11 of the inner link space C11 defined between the opposed inner link plates C1. The chain-engaging axial width W1 is smaller than the axial width WC21 of the outer link space C21 defined between the opposed outer link plates C2.

As seen in FIG. 2, the inner guide plate 40 is spaced apart from the outer guide plate 42 in the pulley axial direction D1. The at least one pulley 46 is provided between the inner guide plate 40 and the outer guide plate 42 in the pulley axial direction D1. In this embodiment, the guide pulley 52 and the tension pulley 54 are provided between the inner guide plate 40 and the outer guide plate 42 in the pulley axial direction D1.

Figure 7:
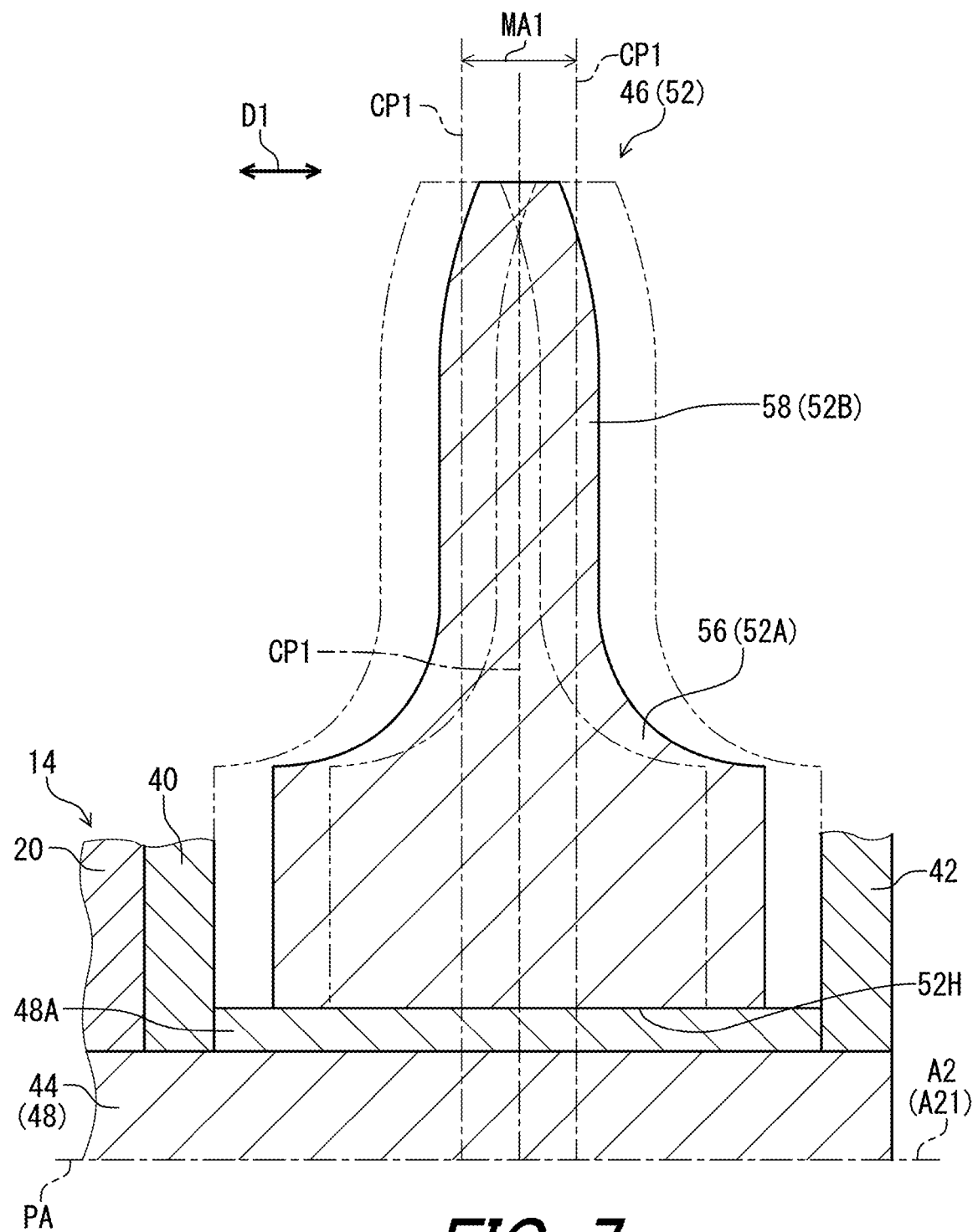
FIG. 7 is a cross-sectional view of the guide pulley of the bicycle derailleur illustrated in FIG. 3.
Figure 8:
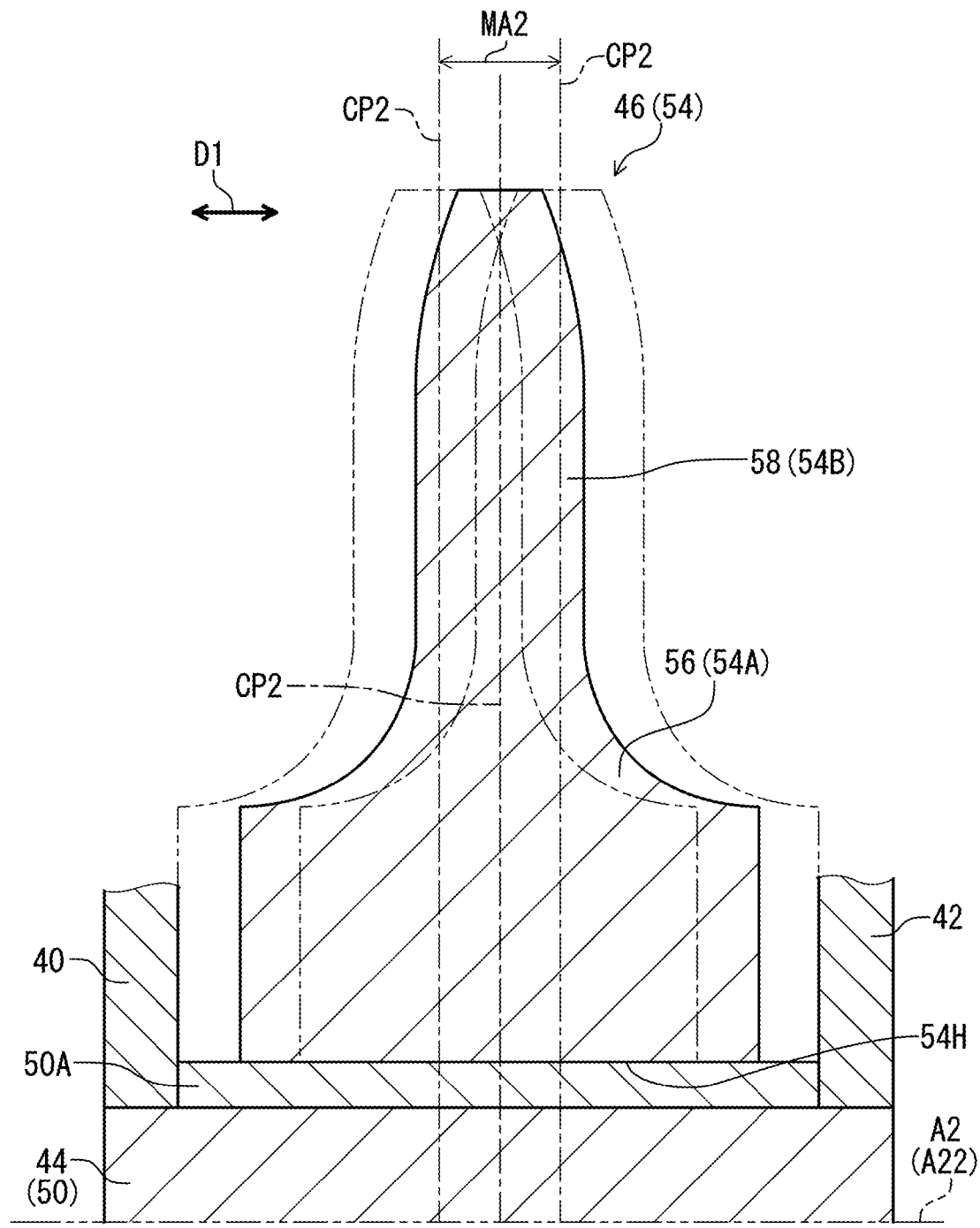
FIG. 8 is a cross-sectional view of the tension pulley of the bicycle derailleur illustrated in FIG. 3.

As seen in FIGS. 7 and 8, the at least one pulley 46 is configured to be movable between the inner guide plate 40 and the outer guide plate 42 within a maximum pulley movable amount MA1 or MA2 in the pulley axial direction D1 with respect to the rotational center axis A2 of the at least one pulley 46.

As seen in FIG. 7, the guide pulley 52 is configured to be movable between the inner guide plate 40 and the outer guide plate 42 within the maximum pulley movable amount MA1 in the pulley axial direction D1. The maximum pulley movable amount MA1 is defined as a distance between a position where the guide pulley 52 is in contact with the inner guide plate 40 and a position where the guide pulley 52 is in contact with the outer guide plate 42. A ratio of the maximum pulley movable amount MA1 to the single shifting distance SD ranges from 0.21 to 0.35. The ratio of the maximum pulley movable amount MA1 to the single shifting distance SD ranges from 0.24 to 0.30. However, the ratio of the maximum pulley movable amount MA1 to the single shifting distance SD is not limited to this embodiment and the above ranges.

The maximum pulley movable amount MA1 is larger than 0.8 mm. The maximum pulley movable amount MA1 is larger than 0.9 mm. The maximum pulley movable amount MA1 is smaller than 1.5 mm. The maximum pulley movable amount MA1 is preferably larger than 1 mm. The maximum pulley movable amount MA1 is preferably smaller than 1.2 mm. However, the maximum pulley movable amount MA1 is not limited to this embodiment and the above ranges.

In this embodiment, the bicycle derailleur 10 comprises a guide-pulley bush 48A provided between the guide pulley 52 and the guide-pulley axle 48 to support the guide pulley 52 rotatably and slidably relative to the guide-pulley axle 48. The guide-pulley body 52A includes a hole 52H. The guide-pulley axle 48 and the guide-pulley bush 48A extend through the hole 52H. However, the guide-pulley bush 48A can be omitted from the bicycle derailleur 10 or can be replaced with other structures such as a bearing. The guide-pulley axle 48 pivotally couples the chain guide 16 to the movable member 14 about the pivot axis PA.

In this embodiment, the guide-pulley body 52A and the plurality of guide-pulley teeth 52B are movable relative to the inner guide plate 40 and the outer guide plate 42 within the maximum pulley movable amount MA1 in the pulley axial direction D1. However, only the plurality of guide-pulley teeth 52B can be configured to be movable relative to the inner guide plate 40 and the outer guide plate 42 within the maximum pulley movable amount MA1 in the pulley axial direction D1.

As seen in FIG. 8, the tension pulley 54 is configured to be movable between the inner guide plate 40 and the outer guide plate 42 within the maximum pulley movable amount MA2 in the pulley axial direction D1. The maximum pulley movable amount MA2 is defined as a distance between a position where the tension pulley 54 is in contact with the inner guide plate 40 and a position where the tension pulley 54 is in contact with the outer guide plate 42. A ratio of the maximum pulley movable amount MA2 to the single shifting distance SD ranges from 0.21 to 0.35. The ratio of the maximum pulley movable amount MA2 to the single shifting distance SD ranges from 0.24 to 0.30. However, the ratio of the maximum pulley movable amount MA2 to the single shifting distance SD is not limited to this embodiment and the above ranges.

The maximum pulley movable amount MA2 is larger than 0.8 mm. The maximum pulley movable amount MA2 is larger than 0.9 mm. The maximum pulley movable amount MA2 is smaller than 1.5 mm. The maximum pulley movable amount MA2 is preferably larger than 1 mm. The maximum pulley movable amount MA2 is preferably smaller than 1.2 mm. However, the maximum pulley movable amount MA2 is not limited to this embodiment and the above ranges.

With the bicycle derailleur 10, a position of the at least one pulley 46 can be automatically and effectively adjusted in the pulley axial direction D1 when an actual position of the chain guide 16 is offset from the shifting position in the pulley axial direction D1. Thus, it is possible to absorb error of the position of the chain guide 16, improving a shifting operation of the bicycle chain C. Furthermore, the position of the at least one pulley 46 can be automatically and effectively adjusted in the pulley axial direction D1 when the chain guide 16 is moved from a current shifting position to an adjacent shifting position to shift the bicycle chain C from a current sprocket to an adjacent sprocket. This can smooth the movement of the bicycle chain C from the current sprocket to the adjacent sprocket during the shifting operation.

In this embodiment, the bicycle derailleur 10 comprises a tension-pulley bush 50A provided between the tension pulley 54 and the tension-pulley axle 50 to support the tension pulley 54 rotatably and slidably relative to the tension-pulley axle 50. The tension-pulley body 54A includes a hole 54H. The tension-pulley axle 50 and the tension-pulley bush 50A extend through the hole 54H. However, the tension-pulley bush 50A can be omitted from the bicycle derailleur 10 or can be replaced with other structures such as a bearing.

In this embodiment, the tension-pulley body 54A and the plurality of tension-pulley teeth 54B are movable relative to the inner guide plate 40 and the outer guide plate 42 within the maximum pulley movable amount MA2 in the pulley axial direction D1. However, only the plurality of tension-pulley teeth 54B can be configured to be movable relative to the inner guide plate 40 and the outer guide plate 42 within the maximum pulley movable amount MA2 in the pulley axial direction D1.

First Modification

Figure 9:
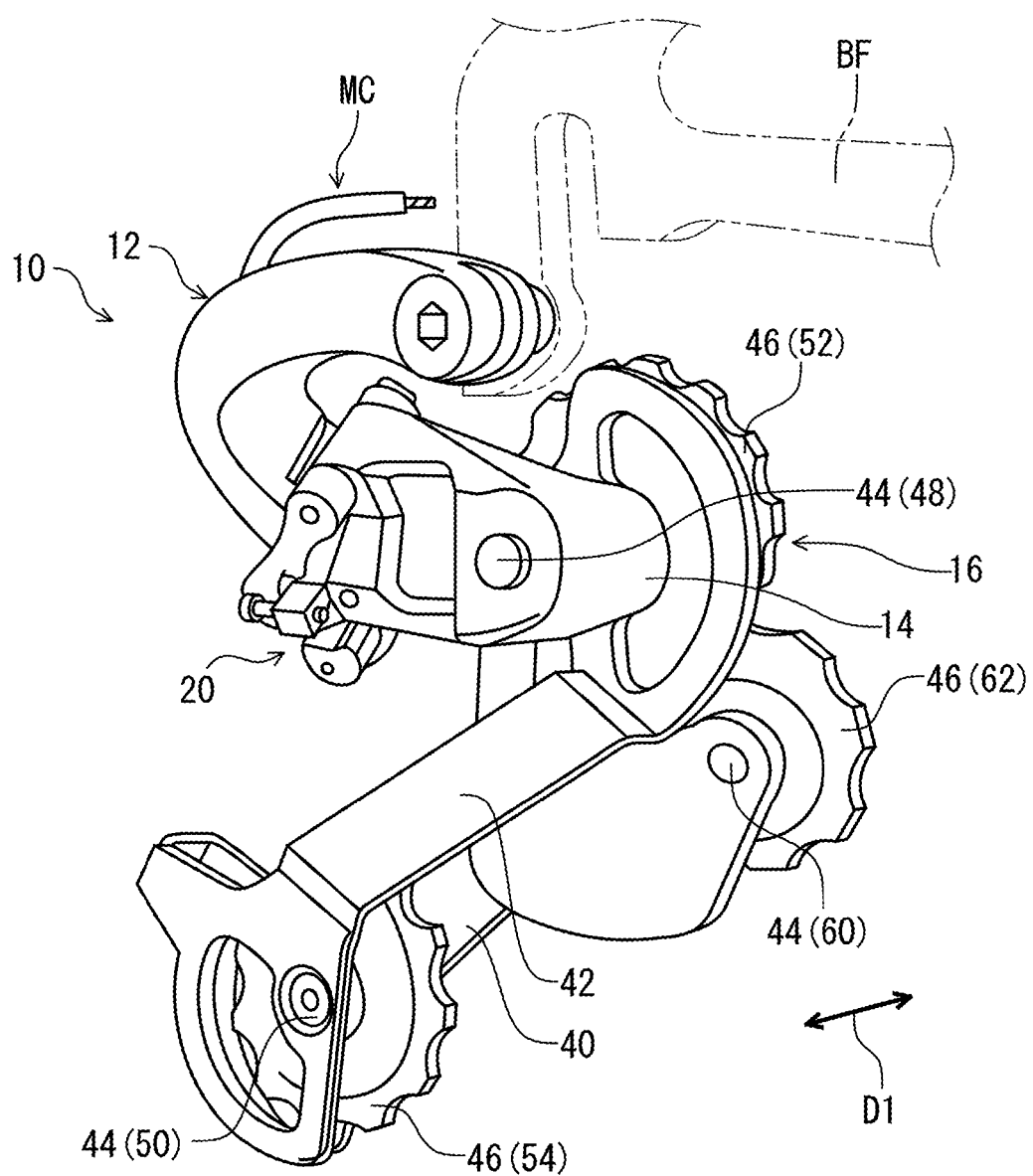
FIG. 9 is a perspective view of a bicycle derailleur in accordance with a first modification of the embodiment.

In the above embodiment, the at least one pulley axle 44 includes the guide-pulley axle 48 and the tension-pulley axle 50. The at least one pulley 46 includes the guide pulley 52 and the tension pulley 54. As seen in FIG. 9, however, the at least one pulley axle 44 can further include an additional pulley axle 60. The at least one pulley 46 can further include an additional pulley 62 configured to be rotatably supported around the additional pulley axle 60. The additional pulley 62 can be configured to be movable between the inner guide plate 40 and the outer guide plate 42 within a maximum pulley movable amount in the pulley axial direction D1.

Second Modification

In the above embodiment and the first modification, the chain-engaging axial widths W1 of the guide-pulley teeth 52B are equal to each other. The chain-engaging axial widths W2 of the tension-pulley teeth 54B are equal to each other. However, at least one of the guide-pulley teeth 52B can has the chain-engaging axial width W1 different from the chain-engaging axial width W1 of another of the guide-pulley teeth 52B. At least one of the tension-pulley teeth 54B can has the chain-engaging axial width different W2 from the chain-engaging axial width W2 of another of the tension-pulley teeth 54B.

Figure 10:
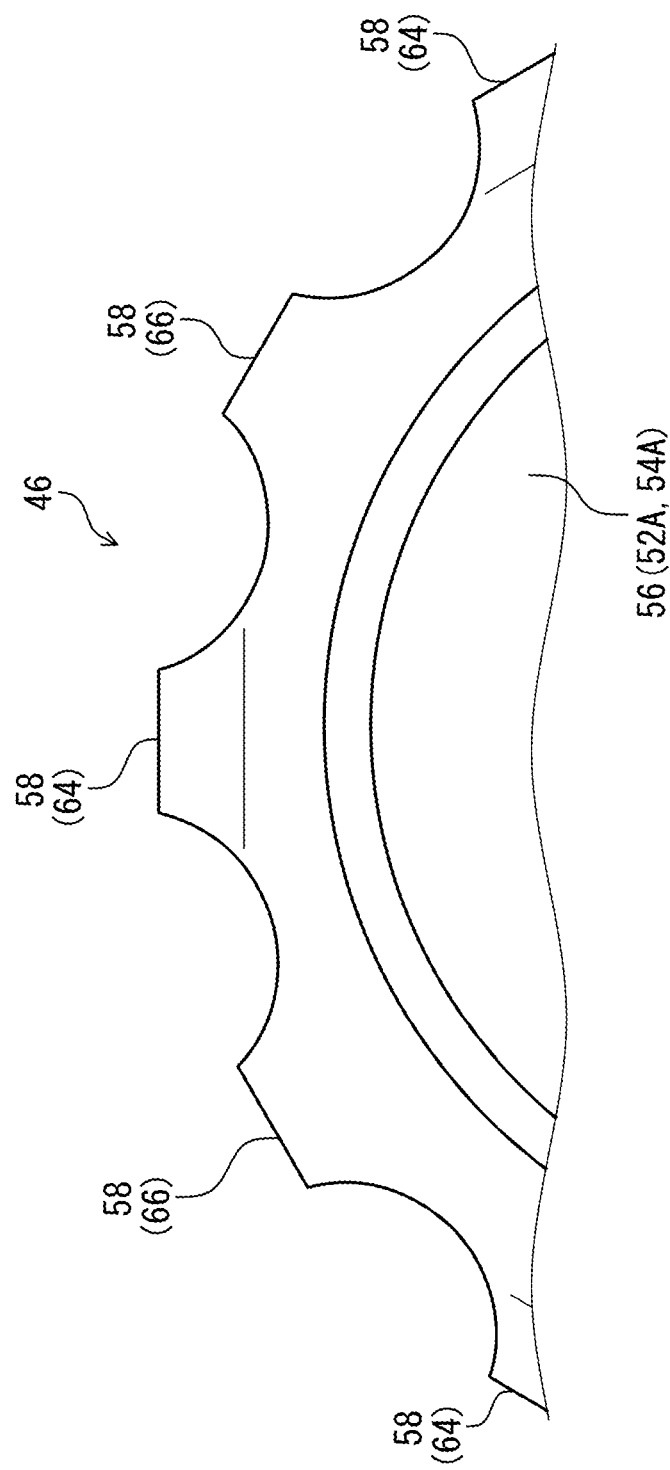
FIG. 10 is a side elevational view of a pulley of a bicycle derailleur in accordance with a second modification of the embodiment.

As seen in FIG. 10, for example, the plurality of pulley teeth 58 can include at least one first pulley tooth 64 and at least one second pulley tooth 66. The plurality of pulley teeth 58 can include a plurality of first pulley teeth 64 and a plurality of second pulley teeth 66. The first pulley teeth 64 and the second pulley teeth 66 are circumferentially alternately arranged. The at least one first pulley tooth 64 radially outwardly from the pulley body 56. The at least one second pulley tooth 66 radially outwardly from the pulley body 56.

Figure 11:
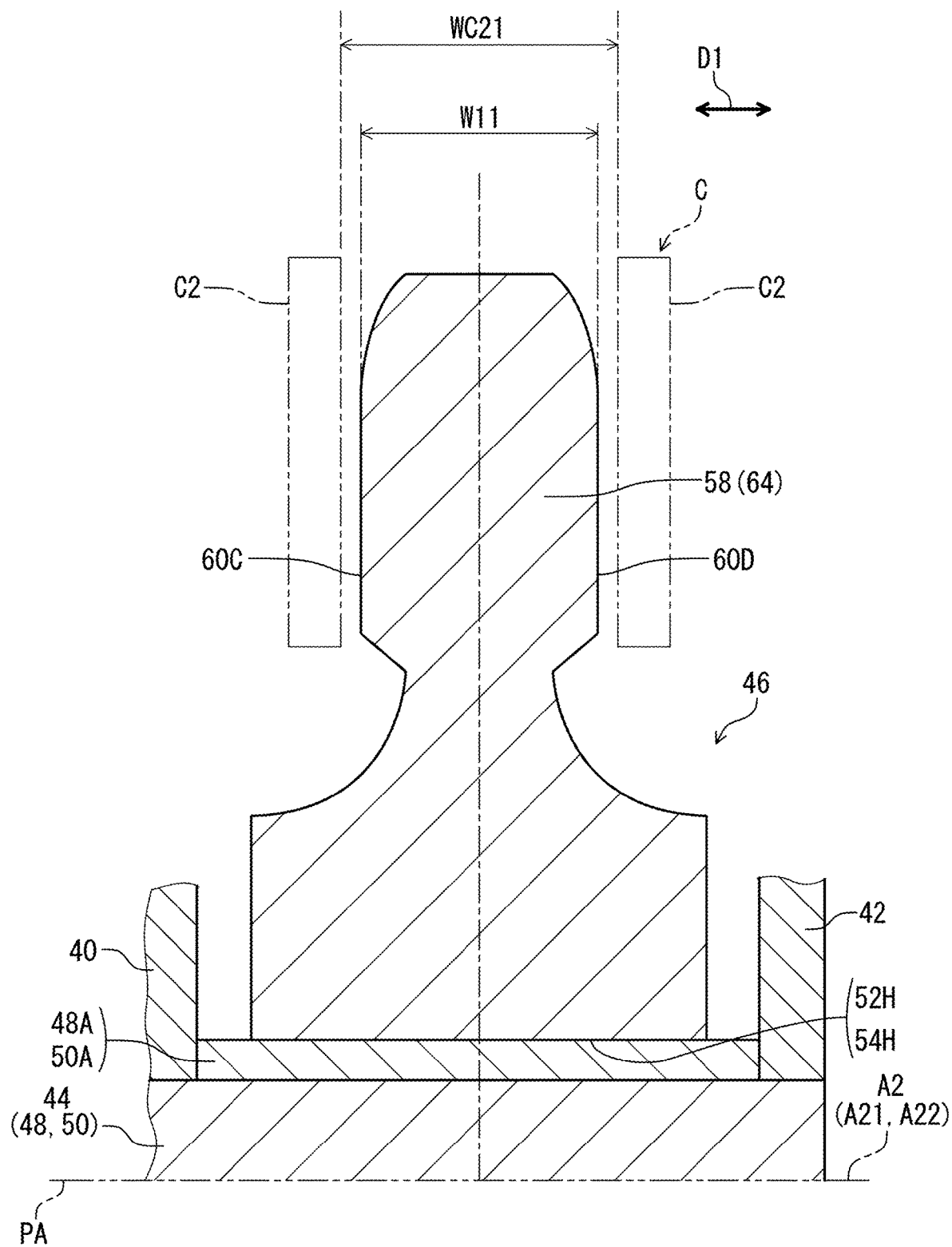
FIG. 11 is a cross-sectional view of a guide pulley of the bicycle derailleur in accordance with the second modification of the embodiment.

As seen in FIG. 11, for example, the at least one first pulley tooth 64 is configured to engage with the pair of opposed outer link plates C2 of the bicycle chain C. The at least one first pulley tooth 64 has a first chain-engaging axial width W11 defined in the pulley axial direction D1. The first pulley tooth 64 includes a first axial surface 60C and a second axial surface 60D. The first axial surface 60C faces in the pulley axial direction D1 to be engageable with one of the opposed outer link plates C2 of the bicycle chain C The second axial surface 60D faces in the pulley axial direction D1 to be engageable with the other of the opposed outer link plates C2 of the bicycle chain C. The second axial surface 60D is provided on a reverse side of the first axial surface 60C in the pulley axial direction D1. The first chain-engaging axial width W11 is defined from the first axial surface 60C to the second axial surface 60D in the pulley axial direction D1.

Figure 12:
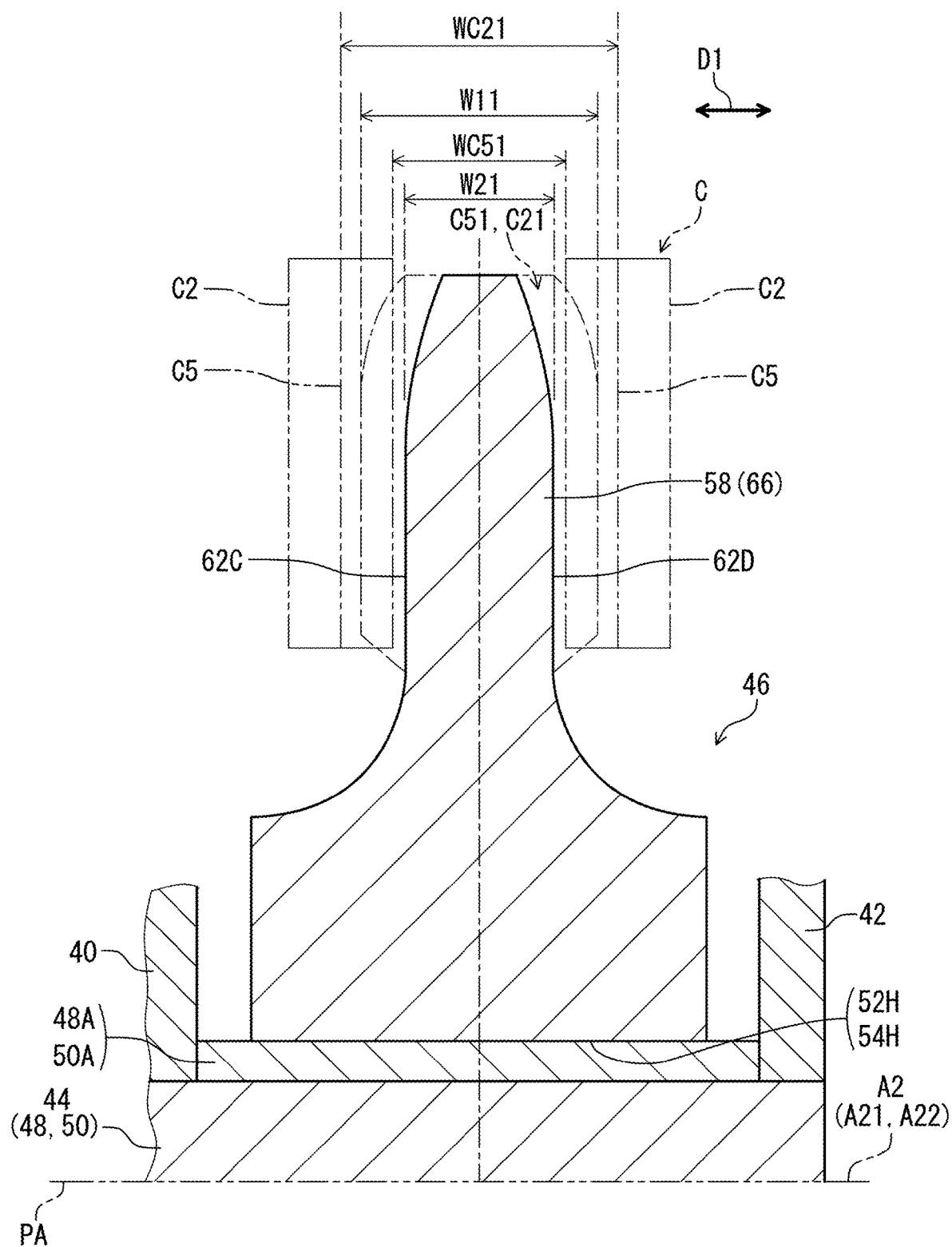
FIG. 12 is a cross-sectional view of the tension pulley of the bicycle derailleur in accordance with the second modification of the embodiment.

As seen in FIG. 12, for example, the at least one second pulley tooth 66 is configured to engage with a pair of opposed inner link plates C5 of the bicycle chain C. The at least one second pulley tooth 66 has a second chain-engaging axial width W21 that is smaller than the first chain-engaging axial width W11. The second chain-engaging axial width W21 is defined in the pulley axial direction D1. The second pulley tooth 66 includes a second axial surface 62C and a second axial surface 62D. The second axial surface 62C faces in the pulley axial direction D1 to be engageable with one of the opposed inner link plates C5 of the bicycle chain C. The second axial surface 62D faces in the pulley axial direction D1 to be engageable with the other of the opposed inner link plates C5 of the bicycle chain C. The second axial surface 62D is provided on a reverse side of the second axial surface 62C in the pulley axial direction D1. The second chain-engaging axial width W21 is defined from the second axial surface 62C to the second axial surface 62D in the pulley axial direction D1. The second chain-engaging axial width W21 is smaller than an axial width WC51 of the inner link space C51 defined between the opposed inner link plates C5. The first chain-engaging axial width W11 is larger than the axial width WC51 of the inner link space C51.

Figure 13:
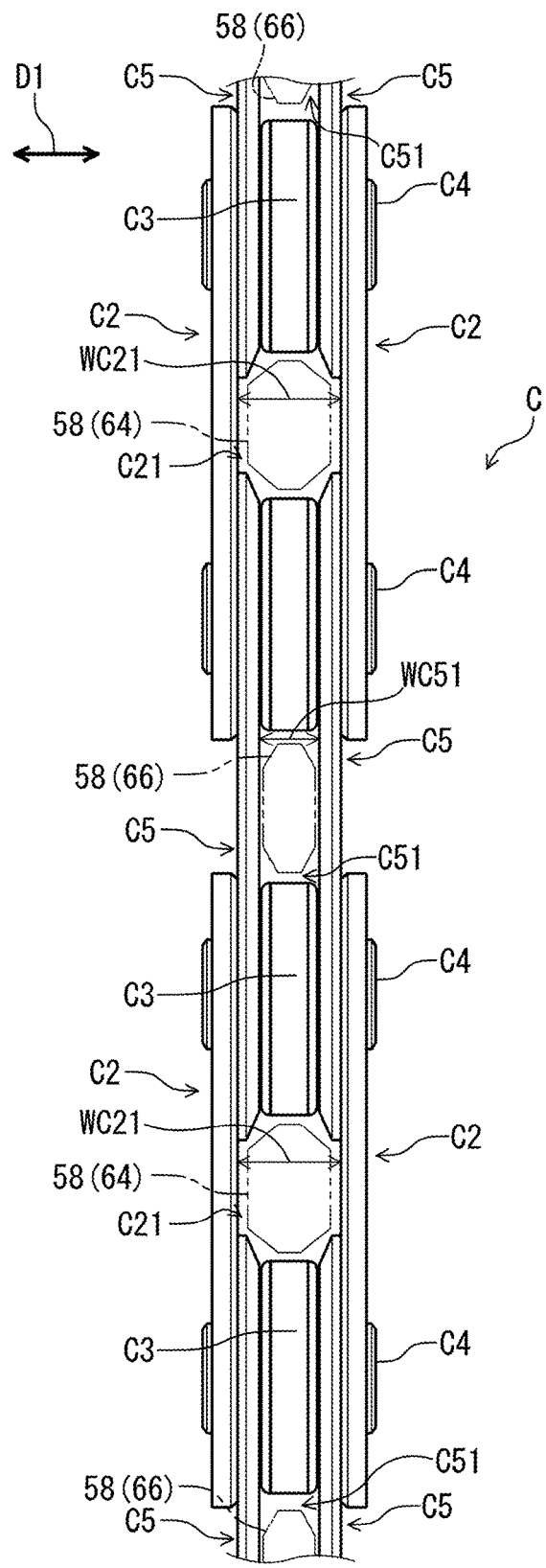
FIG. 13 is a top view of a bicycle chain corresponding to the bicycle derailleur in accordance with the second modification.

As seen in FIG. 13, the inner link plate C5 has a shape different from a shape of the inner link plate C1 illustrated in FIG. 4. The recess C1R is omitted from the inner link plate C5. However, the inner link plate C5 can have the same shape as that of the inner link plate C1.

Other Modifications

In the above embodiment and the first and second modification, the shifting positions P1 to P11 are defined based on the chain guide 16. However, the shifting positions P1 to P11 can be defined based on other members such as the movable member 14.

In the above embodiment and the modifications, an actuation ratio of an amount of operation of the operating device 2 (e.g., an amount of movement of the inner wire MC1 relative to the outer casing MC2) to an amount of movement of the chain guide 16 is equal to or lower than 1.5. The actuation ratio of the amount of operation of the operating device 2 to an amount of movement of the chain guide 16 is preferably equal to or lower than 1.1. However, the actuation ratio is not limited to the above embodiment and the modifications.

In the above embodiment and the modifications, the guide pulley 52 and the tension pulley 54 are movable relative to the inner guide plate 40 and the outer guide plate 42 within the maximum pulley movable amount in the pulley axial direction D1. However, one of the guide pulley 52 and the tension pulley 54 can be configured to be non-movable relative to the inner guide plate 40 and the outer guide plate 42 in the pulley axial direction D1 or movable relative to the inner guide plate 40 and the outer guide plate 42 in the pulley axial direction D1 within a movable amount smaller than the maximum pulley movable amount.

In the above embodiment and the modifications, the bicycle derailleur 10 is configured to be connected to the operating device 2 with the mechanical cable MC. However, the bicycle derailleur 10 can be configured to be connected to the operating device 2 with an electrical cable or wireless communication path. In such embodiments, for example, the bicycle derailleur 10 comprises an electric actuator configured to move the movable member 14 and/or the chain guide 16 in response to a signal generated in the operating device 2. The bicycle derailleur 10 can comprise a position sensor configured to sense a position of the movable member 14 or the chain guide 16 as a current shifting position of the bicycle derailleur 10. The bicycle derailleur 10 can comprise a wireless communicator configured to wirelessly communicate with the operating device 2. The actuator is connected to the wireless communicator to move the chain guide relative to the base member in response to a wireless signal received by the wireless communicator from the operating device 2. The bicycle derailleur 10 can comprises a power supply connected to the actuator and the wireless communicator to supply electric power to the actuator and the wireless communicator. The actuator can be mounted to one of the base member 12, the movable member 14, the chain guide 16, and the linkage structure 20. The wireless communicator can be mounted to one of the base member 12, the movable member 14, the chain guide 16, and the linkage structure 20. The power supply can be mounted to one of the base member 12, the movable member 14, the chain guide 16, and the linkage structure 20.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle derailleur comprising:
a base member configured to be attached to a bicycle frame;
a movable member configured to be movable relative to the base member;
a chain guide mounted to the movable member, the chain guide comprising:
an inner guide plate;
an outer guide plate;
at least one pulley axle configured to be coupled to the inner guide plate and the outer guide plate; and
at least one pulley configured to be rotatably supported around the at least one pulley axle;
the chain guide being configured to be movable between a plurality of shifting positions;
the at least one pulley being configured to be movable between the inner guide plate and the outer guide plate within a maximum pulley movable amount in a pulley axial direction with respect to a rotational center axis of the at least one pulley;
a single shifting distance being defined between adjacent shifting positions of the plurality of shifting positions;
a ratio of the maximum pulley movable amount to the single shifting distance ranging from 0.21 to 0.35;
the at least one pulley being movable from an inner surface of the inner guide plate to an inner surface of the outer guide plate;
the at least one pulley including a first end a second end in the pulley axial direction; and
the first end and the second end being supported by the at least one pulley axle.

2. The bicycle derailleur according to claim 1, wherein the ratio of the maximum pulley movable amount to the single shifting distance ranges from 0.24 to 0.30.

3. The bicycle derailleur according to claim 1, wherein the plurality of shifting positions includes at least nine shifting positions.

4. The bicycle derailleur according to claim 1, wherein the plurality of shifting positions includes at least eleven shifting positions.

5. The bicycle derailleur according to claim 1, wherein the at least one pulley axle includes a guide-pulley axle and a tension-pulley axle, the at least one pulley includes
  a guide pulley configured to be rotatably supported around the guide-pulley axle, and
  a tension pulley configured to be rotatably supported around the tension-pulley axle, and
the guide pulley is configured to be movable between the inner guide plate and the outer guide plate within the maximum pulley movable amount in the pulley axial direction.

6. The bicycle derailleur according to claim 5, wherein
the at least one pulley axle further includes an additional pulley axle, and
the at least one pulley further includes an additional pulley configured to be rotatably supported around the additional pulley axle.

7. The bicycle derailleur according to claim 1, wherein
the at least one pulley includes a pulley body and a plurality of pulley teeth extending radially outwardly from the pulley body with respect to the rotational center axis, and
the plurality of pulley teeth includes
  at least one first pulley tooth having a first chain-engaging axial width, and
  at least one second pulley tooth having a second chain-engaging axial width that is smaller than the first chain-engaging axial width.

8. The bicycle derailleur according to claim 7, wherein
the at least one first pulley tooth is configured to engage with a pair of opposed outer link plates of a bicycle chain, and
the at least one second pulley tooth is configured to engage with a pair of opposed inner link plates of the bicycle chain.

9. A bicycle derailleur comprising:
a base member configured to be attached to a bicycle frame;
a movable member configured to be movable relative to the base member;
a chain guide mounted to the movable member, the chain guide comprising:
  an inner guide plate;
  an outer guide plate;
  at least one pulley axle configured to be coupled to the inner guide plate and the outer guide plate; and
  at least one pulley configured to be rotatably supported around the at least one pulley axle;
the chain guide being configured to be movable between a plurality of shifting positions;
the at least one pulley being configured to be movable between the inner guide plate and the outer guide plate within a maximum pulley movable amount in a pulley axial direction with respect to a rotational center axis of the at least one pulley;
a single shifting distance being defined between adjacent shifting positions of the plurality of shifting positions, the single shifting distance being smaller than 4.8 mm;
the maximum pulley movable amount being larger than 0.8 mm;
the at least one pulley being movable from an inner surface of the inner guide plate to an inner surface of the outer guide plate;
the at least one pulley including a first end a second end in the pulley axial direction; and
the first end and the second end being supported by the at least one pulley axle.

10. The bicycle derailleur according to claim 9, wherein
the single shifting distance is smaller than 4.5 mm.

11. The bicycle derailleur according to claim 9, wherein
the single shifting distance is smaller than 4.2 mm.

12. The bicycle derailleur according to claim 9, wherein
the single shifting distance is larger than 3.5 mm.

13. The bicycle derailleur according to claim 9, wherein
the maximum pulley movable amount is larger than 0.9 mm.

14. The bicycle derailleur according to claim 9, wherein
the maximum pulley movable amount is smaller than 1.5 mm.

15. The bicycle derailleur according to claim 9, wherein
the plurality of shifting positions includes at least nine shifting positions.

16. The bicycle derailleur according to claim 9, wherein
the plurality of shifting positions includes at least eleven shifting positions.

17. The bicycle derailleur according to claim 9, wherein
the at least one pulley axle includes a guide-pulley axle and a tension-pulley axle,
the at least one pulley includes
  a guide pulley configured to be rotatably supported around the guide-pulley axle, and
  a tension pulley configured to be rotatably supported around the tension-pulley axle, and
the guide pulley is configured to be movable between the inner guide plate and the outer guide plate within the maximum pulley movable amount in the pulley axial direction.

18. The bicycle derailleur according to claim 17, wherein
the at least one pulley axle further includes an additional pulley axle, and
the at least one pulley further includes an additional pulley configured to be rotatably supported around an additional pulley axle.

19. The bicycle derailleur according to claim 9, wherein
the at least one pulley includes a pulley body and a plurality of pulley teeth extending radially outwardly from the pulley body with respect to the rotational center axis, and
the plurality of pulley teeth includes
  at least one first pulley tooth having a first chain-engaging axial width, and
  at least one second pulley tooth having a second chain-engaging axial width that is smaller than the first chain-engaging axial width.

20. The bicycle derailleur according to claim 19, wherein
the at least one first pulley tooth is configured to engage with a pair of opposed outer link plate of a bicycle chain, and
the at least one second pulley tooth is configured to engage with a pair of opposed inner link plate of the bicycle chain.

21. The bicycle derailleur according to claim 1, wherein
the maximum pulley movable amount extends from the inner surface of the inner guide plate to the inner surface of the outer guide plate.

22. The bicycle derailleur according to claim 1, wherein
the at least one pulley includes a tension pulley configured to be rotatably supported around a tension-pulley axle, and
the tension pulley is configured to be movable between the inner guide plate and the outer guide plate within the maximum pulley movable amount in the pulley axial direction.

23. The bicycle derailleur according to claim 9, wherein the maximum pulley movable amount extends from the inner surface of the inner guide plate to the inner surface of the outer guide plate.

24. The bicycle derailleur according to claim 9, wherein the at least one pulley includes a tension pulley configured to be rotatably supported around a tension-pulley axle, and the tension pulley is configured to be movable between the inner guide plate and the outer guide plate within the maximum pulley movable amount in the pulley axial direction.

* * * * *